United States Patent
Hariharan et al.

(10) Patent No.: US 11,330,451 B2
(45) Date of Patent: May 10, 2022

(54) SERVICE AWARE CLOSED LOOP UPLINK POWER CONTROL OPTIMIZATION

(71) Applicant: VMware, Inc., Palo Alto, CA (US)

(72) Inventors: Srikanth Hariharan, Sunnyvale, CA (US); Sarabjot Singh, Palo Alto, CA (US); Kanthi Nagaraj, Palo Alto, CA (US); Alexandros Anemogiannis, Palo Alto, CA (US)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 16/933,339

(22) Filed: Jul. 20, 2020

(65) Prior Publication Data
US 2022/0022061 A1    Jan. 20, 2022

(51) Int. Cl.
| | | |
|---|---|---|
| *H04W 24/04* | (2009.01) | |
| *H04W 24/06* | (2009.01) | |
| *H04W 24/10* | (2009.01) | |
| *H04B 17/336* | (2015.01) | |
| *H04B 17/318* | (2015.01) | |

(52) U.S. Cl.
CPC ......... *H04W 24/04* (2013.01); *H04B 17/318* (2015.01); *H04B 17/336* (2015.01); *H04W 24/06* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 8,964,587 | B2* | 2/2015 | Ishii | H04L 25/023 370/252 |
| 9,781,685 | B2 | 10/2017 | Tsui | |
| 2012/0314607 | A1* | 12/2012 | Craig | H04W 52/241 370/252 |
| 2013/0142100 | A1* | 6/2013 | Vrzic | H04W 12/033 370/312 |
| 2015/0208366 | A1* | 7/2015 | Papasakellariou | H04W 76/15 370/311 |
| 2015/0208433 | A1* | 7/2015 | Fan | H04B 7/0413 370/329 |
| 2016/0088575 | A1* | 3/2016 | Xu | H04W 52/343 370/331 |
| 2016/0205697 | A1* | 7/2016 | Tan | H04W 24/02 370/329 |
| 2017/0064591 | A1* | 3/2017 | Padfield | H04W 36/20 |
| 2017/0325138 | A1* | 11/2017 | da Silva | H04W 36/00837 |
| 2019/0007873 | A1* | 1/2019 | Kumar Parameswarn Rajamma | H04W 76/23 |

* cited by examiner

*Primary Examiner* — Scott M Sciacca
(74) *Attorney, Agent, or Firm* — Clayton, McKay & Bailey, PC

(57) ABSTRACT

A system can include an evaluation platform that applies models to improve the quality of experience of users impacted by uplink interference at a network cell, such as at a base station. For a user session at a cell, an expected performance with optimized uplink interference can be compared to an actual performance to determine whether the session is impacted. This can include iteratively increasing a hypothetical power parameter and determining uplink interference based on source and neighboring cells. When positively impacted sessions exceed a threshold, the platform can dynamically change the power parameter of the base station to reflect the hypothetical value.

23 Claims, 6 Drawing Sheets

SERVICE AWARE CLOSED LOOP UPLINK POWER CONTROL OPTIMIZATION

BACKGROUND

Providers of Long-Term Evolution ("LTE") networks are constantly attempting to improve user experience. Calls between users can suffer from interference or poor signal quality, making conversation difficult to hear clearly or causing calls to drop altogether.

In some situations, these problems can occur based on poor uplink quality between a user's device and a base station of the LTE network. The base station can broadcast a power value that represents how powerfully user devices should transmit data to the base station. Typically, default power levels are broadcast for an uplink control channel ("PUCCH") and an uplink data channel ("PUSCH"). These power levels are configurable and can be modified at the base station. The user devices that connect to the base station receive these power parameters and adjust their power levels for PUCCH and PUSCH transmissions. However, these power parameters are typically set and left largely forgotten, which can result in suboptimal uplink quality.

The power parameters can include pZeroNominalPucch, pZeroNominalPusch and alpha. pZeroNominalPucch can specify the target power the base station expects to receive from a user device on the control channel. pZeroNominalPusch can specify a target power that the base station expects to receive on the data channel. Alpha can specify a fractional power control parameter on the data channel. If the user device is close to the base station, the user device needs relatively less transmit power and requires higher power when further away. Although pZeroNominalPucch and pZeroNominalPusch can be set based on estimated path loss between user devices and the base station, this still may not provide optimal power transmission from user devices connecting to the base station. For example, pZeroNominalPucch is set for −115 decibel milliwatts ("dBm") and interference power is −110 dBm, then the uplink signal-to-interference ratio ("SINR") is only −5 dBm. This may not allow for good voice quality in cellular conversations.

Current methods of setting the transmission power parameters do not account for interference coming from the various sources at the base station, nor do they account for performance of the user sessions at the base stations. Administrators typically must detect problems and adjust power settings themselves and need better tools for doing so.

As a result, a need exists for a service aware platform that dynamically optimizes uplink power parameters.

SUMMARY

Examples described herein include systems and methods for detecting suboptimal power control parameters and dynamically adjusting the parameters in LTE networks. A closed-loop automation system can find the suboptimal power control parameters leading to degraded subscriber services in LTE networks and dynamically adjust those to better settings.

The system can observe current user session performance, predict future performance with parameter changes, and dynamically adjust transmit power parameters. The observation process can include detecting and quantifying sessions suffering from severe degradation due to SINR. The prediction process can quantify an improvement in subscriber service obtained by changing the power control parameters, which also can allow the system to predict optimized power control parameters. The control process can dynamically adjust the power control parameters through application programming interfaces ("APIs") exposed at the base station, such as by E-UTRAN Node B ("eNodeB") or self-organizing network ("SON") vendors.

An evaluation platform can use a trained performance model to identify cases where users are experiencing poor quality of service due to uplink interference or other problems in the system. Using the performance model, the evaluation platform can compare actual performance of a user session to a normalized performance to determine if uplink interference exists. The performance model can be trained based on historical telemetry data from cells (e.g., base stations). The telemetry data can include performance-related information for cells in the network. Example cells can include base stations, cell towers, or any node within the network. The telemetry data can be session-specific, related to cellular connections in the network.

An evaluation platform can execute as a service at the base station or elsewhere in the telco network, such as on a separate server. The evaluation platform can receive telemetry data regarding user sessions at various cells in the network. The evaluation platform can observe performance of the user sessions, predict expected performance, and dynamically change transmission power parameters of the cells when the expected performance exceeds the actual performance in a threshold number of user sessions.

In one example, the evaluation platform can observe an actual performance value for a first user session at a first cell of a plurality of cells in the telco network. This can include applying telemetry data for the first session as inputs to a trained model. The inputs can represent features of the user session, such as downlink channel quality, uplink channel quality, control and data channel load at cell, active users at cell, bandwidth, multiple-input multiple-output (MIMO) antenna rank, number of antennas, and signal strength. The trained model can output the actual performance value, which can represent throughput or voice quality, in an example.

The platform can also use the trained performance model to predict the expected performance value for the first user session. To make this prediction, the platform can perform what-if analysis, iteratively increasing hypothetical values for one or more of pZeroNominalPusch, alpha, and pZeroNominalPucch and determining how the hypothetical values impact uplink SINR. The new uplink SINR value can be used as an input to the trained performance model along with other actual telemetry values for the user session. The new uplink SINR can be formatted as a key performance indicator ("KPI") that would otherwise be received as telemetry and used in observing actual performance. For example, the new uplink SINR can be a computed KPI that represents a fraction of samples in the user session with uplink SINR that fall below −2 dB based on the hypothetical value. The new uplink SINR can be determined based on a difference between signal power of the first cell for the first user session and interference power of a neighboring cell, the signal power and interference power both being determined using the hypothetical value.

When the power control parameter is increased in a cell, it improves the SINR of certain users in the cell. However, it can also degrade the SINR of certain users in neighboring cells. This is because an increase in uplink transmit power of users in one cell improves their signal but can serve as interference to the neighboring cell. In one example, the evaluation platform can compute the total number of sessions that are positively impacted and subtract the number of sessions that are negatively impacted. When there is a threshold net positive impact, the evaluation platform can go forward with making the change.

The platform can determine an impact on the first user session based on the expected performance value differing from the actual performance value by at least a threshold amount. For example, if the expected throughput exceeds the actual throughput of the user session by a threshold amount, the user session is positively impacted. This determination can be made for multiple user sessions based on the hypothetical values for the power parameters. The platform can determine a total number of user sessions that are positively impacted. This can be compared against a threshold number required to change the power parameters to the hypothetical values. The threshold number can be selected on a graphical user interface ("GUI") by an administrator and can differ per cell.

When the threshold (total or net) is met, the platform can dynamically adjust a power level parameter at the first cell (and potentially others) based on the hypothetical value(s). This can include making an API call to the cell or an interface that is exposed for controlling the cell. Conversely, in an instance where the total number of impacted user sessions remains below the threshold, the platform can continue to iteratively increase the hypothetical value. In one example, this is done for a range of values and the hypothetical value(s) resulting in the greatest number of positively impacted user sessions is selected for use in dynamically adjusting transmit power level parameters. The evaluation platform can indicate to a GUI when transmit power parameters are adjusted for a base station.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Figure 1:
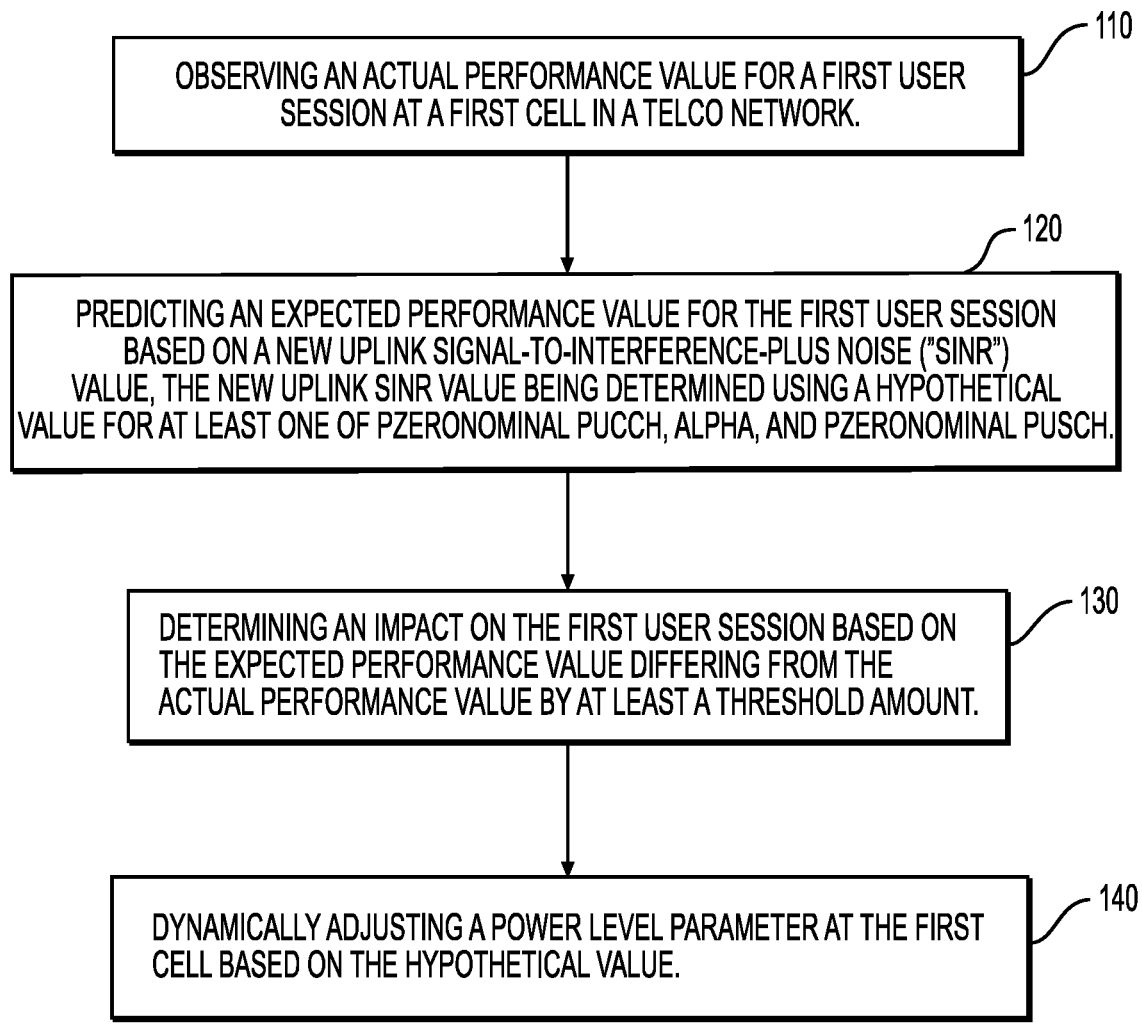
FIG. 1 is a flowchart of an example method for dynamically adjusting transmission power for a user session.

Reference will now be made in detail to the present examples, including examples illustrated in the accompanying drawings. Wherever possible, the same reference numbers will be used throughout the drawings to refer to the same or like parts.

In an example, a closed-loop automated system can identify suboptimal power control parameters leading to degraded LTE subscriber services. The system can adjust the parameters at one or more cells, as needed. The system can include an evaluation platform that executes on a server. The evaluation platform can apply one or more pre-trained performance models to determine power control parameters that should be adjusted at a cell based on user sessions suffering from uplink SINR. The performance models are trained based on network telemetry data that is collected by the evaluation platform. For a session at a cell, an expected performance value can be compared to an actual performance value to determine whether the session is impacted by uplink interference. The performance value can be downlink throughput, voice quality, connection drop rate, or connection setup failure rate, in an example.

The expected performance value can be determined by applying hypothetical session features to the performance model. For example, hypothetical pZeroNominalPucch, pZeroNominalPusch and alpha parameter values can be selected for a cell by incrementing the values iteratively from a known actual starting point. Using the hypothetical values, a what-if model can determine other session features, such as a change in uplink SINR for the session. The change in uplink SINR can be based on a signal power increase at the serving cell compared with increased interference at a neighboring cell. A session KPI representing a ratio of PUSCH SINR or PUCCH SINR for a session that falls below −2 dB can be determined. For example, a session can span five seconds with samples every 50 milliseconds. This determined ratio KPI value can be used as an input at the performance model to determine the new uplink SINR value.

If the expected and actual performance values diverge beyond a threshold amount, this can indicate that the user session is impacted by uplink SINR and can be improved using the hypothetical power parameters. If this is the case for a threshold number of user sessions at the cell, the evaluation platform can dynamically change the power parameters to the hypothetical values. To do this, the evaluation platform can make an API call to change the power parameters at the cell. For example, the API call can be to eNodeB. The eNodeB can then broadcast the new power parameters to the user devices identified in the system information block ("SIB") for the cell.

A GUI can display the cells and number of impacted user sessions or the number of user sessions that would improve with new power parameters. The GUI can also display the current power parameters and the hypothetical power parameters that correspond to the number of user sessions that would improve. The GUI can allow the administrator to select a button to deploy the new parameters. Alternatively, the GUI can allow the administrator to set a threshold number of improved user sessions that the evaluation platform must identify before automatically and dynamically adjusting the power parameters. The threshold set by the administrator can alternatively relate to a ratio of user sessions that would improve, such as 75 percent, in an example.

FIG. 1 is a flowchart of an example method for identifying suboptimal power control parameters and dynamically adjusting power controls at a base station. At stage 110, the evaluation platform can observe an actual performance value, such as throughput, for a first user session at a first cell (e.g., a base station) in a telco network. The observation can be over a time period for the session, such as five seconds. A performance model can receive session telemetry data as input and output the actual throughput or some other performance value, such as voice quality. The actual throughput can represent a current performance state of the session at the cell. Although throughput is used as an example output, other outputs are possible for the performance value.

The performance model can be pre-trained to output throughput based on session features. The performance model can be a neural network, in an example. The model can be trained across user sessions by applying machine learning algorithms to a large set of telemetry data. This can tune the performance model over time for predicting the performance values based on session features. In one example, the session features used as inputs to the model can include downlink channel quality ("CQI"), uplink channel quality ("SINR"), signal strength, power parameters on the cell's control and data channels, cell load, number of antennas present, and packet loss rates, among others.

The observed performance value for the user session can be used as a comparison point to determine potential improvements based on adjustments to the power control parameters at the base station.

At stage 120, the evaluation platform can predict an expected performance value based on hypothetical power control parameters that differ from the current actual power control parameters. This can include using a what-if ("WI") model in conjunction with the performance model to further optimize power control parameter settings. The WI model can be used to determine new inputs to the performance model based on the hypothetical power control parameters. For given hypothetical power control parameters, the WI model can transform features for multiple user sessions into what they would be after the considered power control setting change. The performance model can then map these new session features to the new predicted performance value. If the hypothetical power control setting change increases a threshold number of sessions with improved performance, that setting is passed onto the CONTROL function.

In one example, the WI model can use the hypothetical power parameter values to output a new ratio for SINR below −2 dB. This SINR ratio can then be used as an input to the performance model. The new session features based on the hypothetical values can be combined with other session features that remain actual. Using these inputs, the performance model can output an expected performance value, such as an expected downlink throughput value, in an example. The expected throughput can be considered an estimate based on the hypothetical power parameters, which can result in increased power at the cell but also potential increased interference from a neighboring cell.

The WI model can determine the impact of increasing the pZeroNominalPusch by k dB on a serving cell c. The value of k can be obtained in an iterative manner, with different values being tested by the WI model to determine which value produces performance improvements in the most user sessions. The WI model can determine uplink SINR change for each user session by determining a power increase at the serving cell c and an interference increase at a neighboring cell j.

The WI model can determine the signal power increase in an example through use of Equation 1, below.

$$\text{Signal power increase for session i (dB): } \max(0, \min(PHRi, k)) \quad \text{Equation 1}$$

In Equation 1, PHRi represents the power headroom available for session i. Therefore, Equation 1 uses k as the signal power increase unless k exceeds the power headroom available.

The WI model can determine the interference power increase. In one example, the interference power increase is determined based on a fraction of cell edge users that have non-zero power headroom, the number of neighboring cells, and the estimated path loss of these users to the neighboring cells. This calculation can be done separately for PUCCH and PUSCH. An example calculation is shown in Equation 2, below.

$$\text{Interference power increase (dB): } 10 \log 10((N_j + f_r + (1 - f_r)k')/(N_j + 1)) \quad \text{Equation 2}$$

In Equation 2, k' can be determined using a similar equation to Equation 1, with k'=max(0, min(PHRc, k)). PHRc can represent an average power headroom of cell edge users at cell c. The function $f_r$ can be an average tbs power restricted fraction for the cell edge users at cell c. $N_j$ can represent a number of neighboring cells for cell j.

Then, the ML model can determine SINR change for a user session based on Equation 3, below, which utilizes the results of Equations 1 and 2.

$$\text{SINR change for a session} = \text{increase in signal power (dB)} - \text{increase in interference power (dB)} \quad \text{Equation 3}$$

Equation 3 can be used across samples for a session to determine if the PUSCH or PUCCH SINR is below −2 dB. These results can be used to determine a hypothetical session feature DERIV_PUSCH_SINR_BELOW_NEG2. DERIV_PUSCH_SINR_BELOW_NEG2 can measure the fraction of PUSCH SINR below −2 dB. RADIO_PUSCH_SINR is a session KPI that measures the number of PUSCH SINR samples in different quantization bins, such as [−5, −2], [−2,2], [2,4]. Based on the change calculated in Equation 3, RADIO_PUSCH_SINR can be modified, as can DERIV_PUSCH_SINR_BELOW_NEG2. These new values can be provided as an input to the performance model, along with other features of the user session, at stage 130. So whereas the actual RADIO_PUSCH_SINR and DERIV_PUSCH_SINR_BELOW_NEG2 can be used with the performance model to get an actual performance value, new values for those KPIs can be used as inputs to the performance model when determining an expected performance value.

A similar procedure can be followed with regard to testing a hypothetical value for pZeroNominalPucch. A similar DERIV_PUSCH_SINR_BELOW_NEG2 value can be determined and supplied to the performance model. Whereas an actual value for DERIV_PUSCH_SINR_BELOW_NEG2 can be supplied to the performance model when determining actual performance, the new DERIV_PUSCH_SINR_BELOW_NEG2 can be supplied when determining expected performance.

At stage 130, the evaluation platform can determine an impact on the user session. For example, if a first session has improved performance based on the expected performance value exceeding the actual performance value by at least a threshold amount. For example, if throughput differs by 10% or 20%, the evaluation platform can determine the session is impacted by uplink SINR and that the session would improve with the hypothetical power values.

Stages 110, 120, and 130 can be repeated for other user sessions. This can allow the evaluation platform to gauge how the hypothetical power values would impact multiple or all user sessions.

To find optimal hypothetical power values, the evaluation platform can continue to iteratively increase pZeroNominalPusch and pZeroNominalPucch, re-performing stages 120 and 130 for the new values. The evaluation platform can begin with actual power parameters for the serving cell and one or more neighboring cells j. These beginning power parameters can be retrieved from a database, in an example. The evaluation platform can then increase pZeroNominalPusch by 1 dB on the serving cell c and increase pZeroNominalPusch by 1 dB on neighboring cell j. The WI model can then determine inputs for the performance model at stage 120. The performance model output can be used to determine whether the performance increases for a user session at stage 130. The evaluation platform can then compute a number of sessions with performance improvements based on the hypothetical power values.

The iterations can continue, with the hypothetical power values increasing until no power headroom remains for the cells c and j. The evaluation platform can then select the hypothetical values that yielded the maximum number of sessions with performance gains. These can be the identified optimal values for pZeroNominalPusch and pZeroNominalPucch. In one example, the iteration does not continue if the number of sessions with improved performance does not exceed a minimum threshold.

In this way, the WI model and performance model can be used to determine optimal values for pZeroNominalPusch and pZeroNominalPucch.

At stage 140, the evaluation platform can dynamically adjust a power level parameter at the first cell based on the hypothetical value. The hypothetical value can be the optimum hypothetical value for pZeroNominalPusch or pZeroNominalPucch, determined during the iterations, in an example.

The LTE standard allows power control parameters to be configurable. These parameters can be broadcasted by the eNodeB to the user devices identified on the SIB. eNodeB vendors can allow this parameter to be configured through an API exposed to third party vendors. Using these APIs, the power control parameter settings chosen by the evaluation platform can be configured on the eNodeBs.

A GUI can also indicate the power control changes and the number of sessions with improved performance at the cell where the adjustment occurred. In one example, the GUI represents cells in the network on a map relative to their geographic locations. A first base station can be highlighted on the map when a threshold number of session impacts are detected for the first base station. For example, the evaluation platform can count each session that is impacted in stage 130 and display the number of impacted sessions, in an example. The GUI can also allow the administrator to set threshold numbers of sessions that require impacts before dynamic power control adjustments are made at a cell. The thresholds can be set differently for different cells, in an example.

The GUI can also provide information about the uplink SINR. For example, the evaluation platform can determine which neighboring cells are responsible based on overlapping transmissions with the cell that has impacted sessions.

Figure 2:
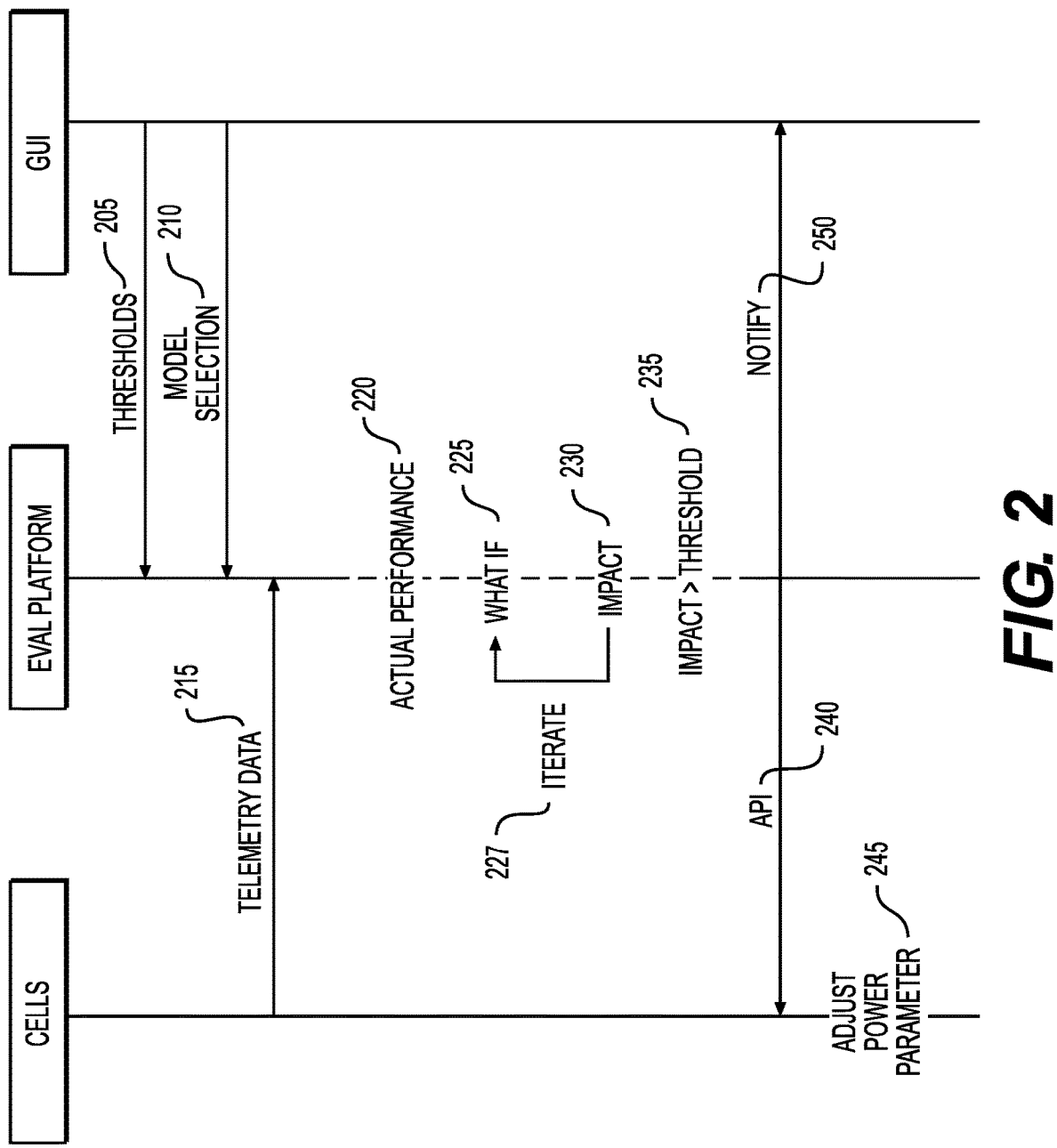
FIG. 2 is a sequence diagram of an example method for dynamically adjusting transmission power for a user session.

FIG. 2 is a sequence diagram of an example method for detecting uplink interference and identifying neighbor cells. At stage 205, an administrator can set thresholds used by the evaluation platform. A first threshold can be a threshold improvement amount that signifies an impacted user session. For example, if the throughput or voice quality increases by 5% from actual to expected, then the user session can be counted as impacted. A second threshold can represent a number or percentage of user sessions that must be impacted before the evaluation platform dynamically adjusts power parameters. For example, a second threshold of 60 percent can mean at least 60 percent of the user sessions listed in the SIB for the cell are impacted. In one example, the GUI can allow the administrator to apply thresholds to one or more cells (e.g., base stations) at one time. The GUI also can allow the administrator to customize thresholds per cell or set maximum power headroom of a cell such that power parameters are not dynamically adjusted above that maximum. The GUI can also allow the administrator to elect to receive a notification regarding a power parameter adjustment recommendation. This can allow the administrator to approve the adjustment before it dynamically occurs without human intervention.

At stage 210, the GUI can also allow the administrator to select the performance model used in optimizing power parameters. Performance models can be trained using different data sets and can also have different inputs and outputs. Performance models can be selected to align with the available session telemetry data available at base stations within the network. Some performance models may output a performance value related to throughput. However, other types of performance values, such as those related to voice quality, connection drop rate, connection setup failure rate are also possible. The thresholds set in stage 205 can be stored with a performance model in an example, preventing the administrator from having to adjust thresholds each time a different model is deployed.

At stage 210, telemetry data can be received at the evaluation platform from various cells within the mobile network. Stage 210 can be ongoing in an example, with telemetry data being received at periodic intervals or constantly queued from reporting cells. The telemetry data can be captured and measured in real time by base stations, which send the telemetry data to the evaluation platform.

Based on past telemetry data and telemetry data at stage 215, the evaluation platform or some other process can train a performance model. Regression analysis and machine learning can be used to train the model. In one example, the inputs are used to train the model with respect to throughput, which can be measured at a cell. This can result in a model that acts as a neural network and outputs a performance value, such as throughput, based on telemetry inputs. The inputs can be vectors of session features in an example.

At stage 220, an actual performance value can be determined using the session's actual features. A vector of session features can be used as an input or to determine inputs to the performance model. The vector can include CQI, SINR, signal strength, load on the base station control and data channels, number of antennas, and others. These can be non-normalized and supplied as inputs to the performance model. The performance model can output the actual performance value, which can be a throughput value.

At stage 225, the WI model can determine what change would occur in uplink SINR based on changes to power parameters, such as pZeroNominalPucch and pZeroNominalPusch. The WI model can output changes to session features based on the hypothetical values of pZeroNominalPucch and pZeroNominalPusch. For example, the WI model can utilize Equations 1, 2, and 3 as described previously with regard to stage 120 of FIG. 1.

The changed session features, such as changing RADIO_PUSCH_SINR to the DERIV_PUSCH_SINR_BELOW_NEG2 value, can be used to determine an impacted user session at stage 230. The changed session features can be used along with existing session features (where no change exists) as inputs to the performance model. This can result in an expected performance value, based on the hypothetical power parameter values used in the WI model. The output for the actual performance can then be compared to the output for the expected performance. If a threshold improvement exists, then the user session can be counted as impacted with respect to the hypothetical power parameter values. As stated before, the threshold improvement, such as 10%, can be selected by the administrator at stage 205

At stage 227, the evaluation platform analysis can iterate by increasing the value of at least one of the power parameters and reperforming stages 225 and 230. In one example, the iteration can continue so long as the hypothetical power parameters are below the maximum power headroom of the cell. For example, pZeroNominalPucch can begin at the cell's current value but increase by 1 dB with each iteration. Power control schemes for the cells can be stored in a database. The evaluation platform can continuously read the existing values for pZeroNominalPusch, alpha, and pZeroNominalPucch and store those in a database. When a parameter is changed, the new value can be stored in the database.

When a session is impacted by uplink SINR, at stage 235 the evaluation platform can count the session as impacted. The evaluation model can perform the analysis of stages 220-230 for other user sessions at the cell and count additional impacts when they are detected at stage 230. When the total number of impacted user sessions exceeds a threshold (either total number or percentage), then the evaluation platform can change the power parameters based on the hypothetical values.

In one example, at stage 240 the evaluation platform can make an API call to the base station, such as an eNodeB station. The exposed API of the base station can allow the evaluation platform to adjust parameters for PUSCH, such as pZeroNominalPusch or alpha, which is a fractional power control. Likewise, the API can allow adjustments on PUCCH, such as pZeroNominalPucch. Based on the API call, the base station can adjust the power parameter at stage 245. This can result in new power settings being broadcasted to the current and future user sessions, in turn causing the user devices to transmit according to the new power parameters.

At stage 250, the change can be reflected on the GUI. This can include sending a notification to the administrator or simply providing a visual indicator on a map of network cells. A cell with changed settings can highlight differently, allowing an administrator to investigate parameter change history for that cell.

Figure 3A:
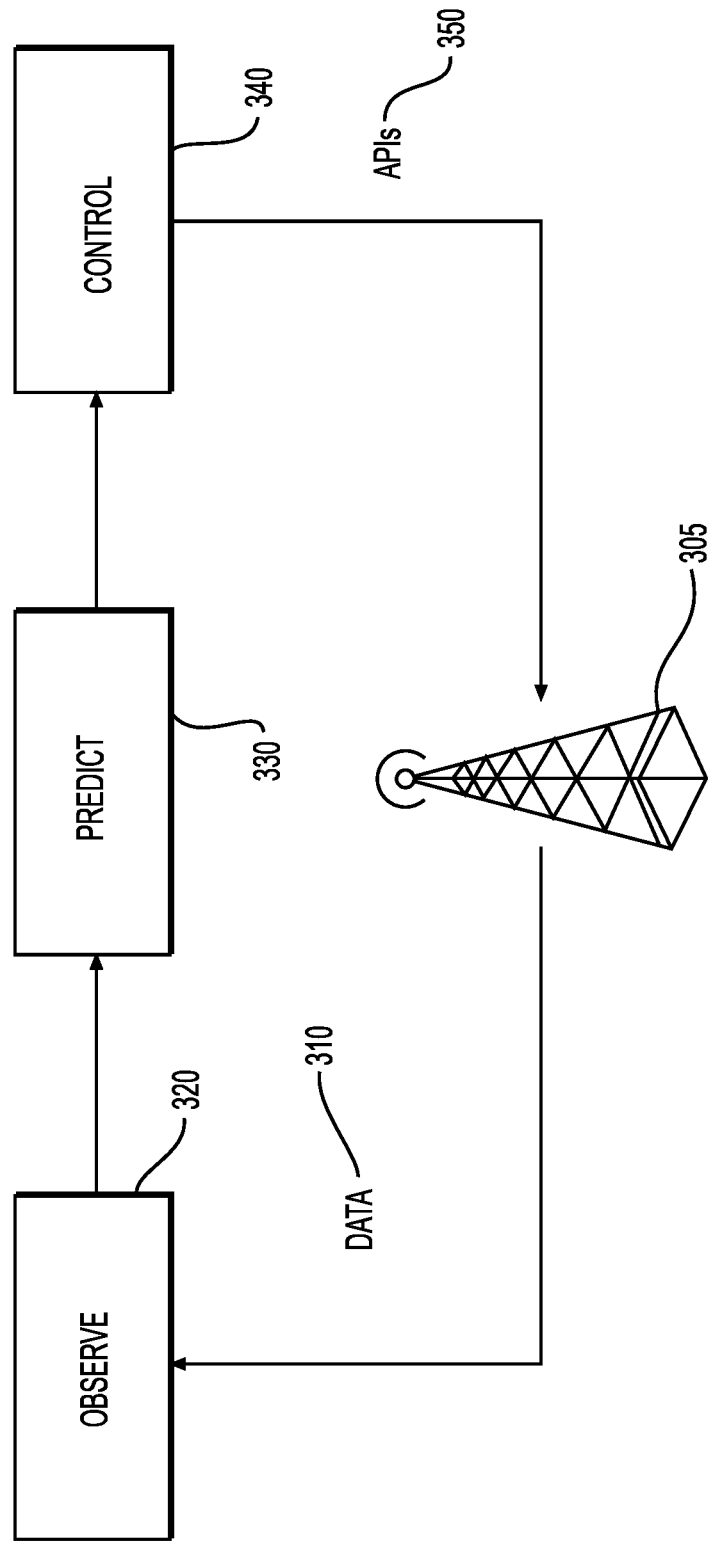
FIG. 3A is a flowchart of an example method for closed-loop parameter adjustment.

FIG. 3A is a flowchart of an example method for closed-loop power parameter adjustment. At stage 310, the base station 305 can send telemetry data to the evaluation platform. An observation process can collate context of the user session into a vector of session features at stage 320.

At stage 330, a prediction process can use a WI model in conjunction with a performance model to identify optimal power control settings. For given power control parameters, the WI model can transform the features for all the sessions into what they would be after the considered power control setting change. The performance model can then map the new session features to the new predicted performance. If the considered power control setting change increases the number of sessions with improved performance, that setting can be passed onto the control function.

At stage 340, the control function can adjust power parameters at the base station 305. This can include calling APIs at stage 350.

Figure 3B:
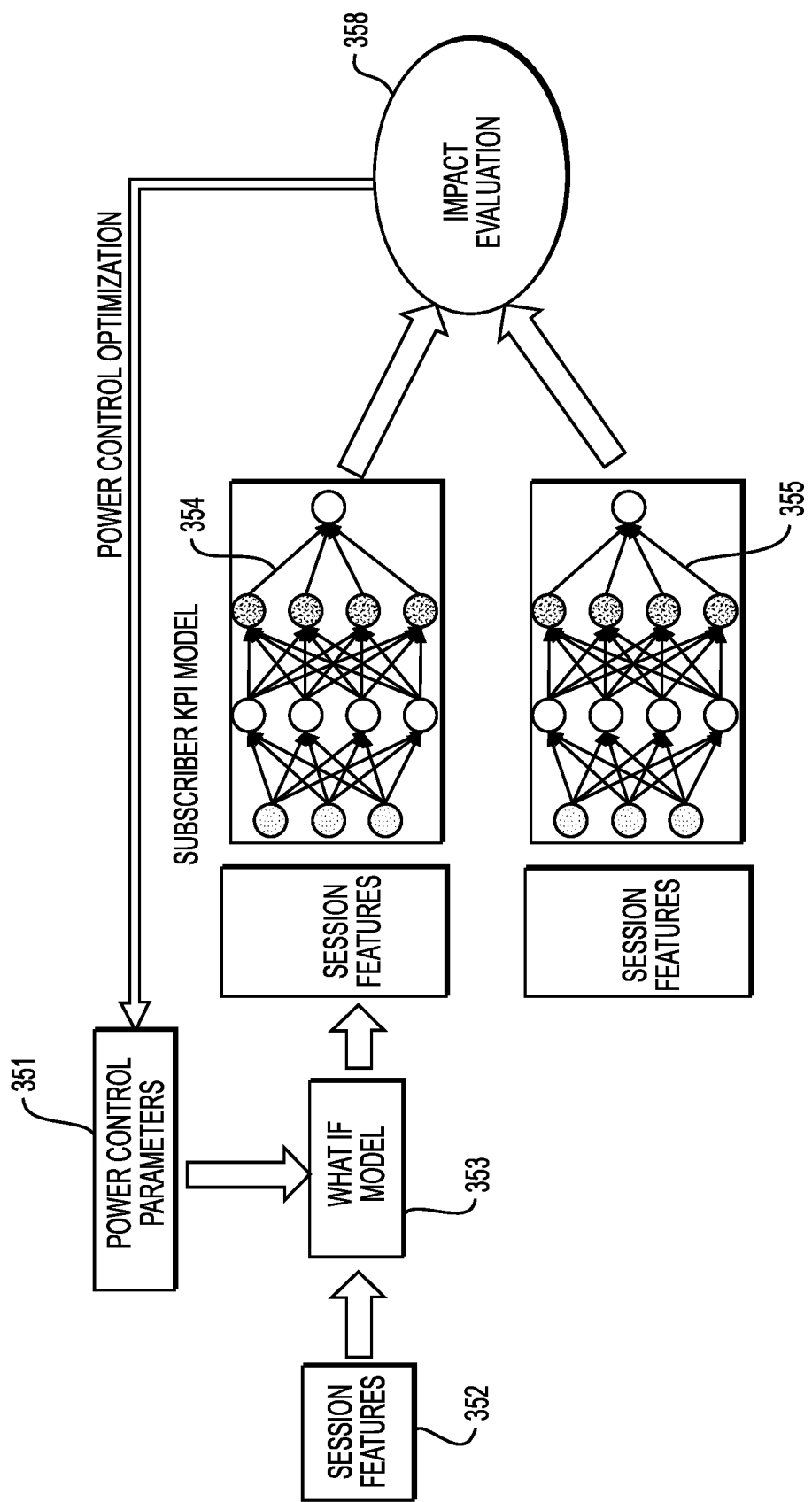
FIG. 3B is an example illustration of system components uplink SINR identification using performance models.

FIG. 3B is a flowchart of an example method for using WI and performance models to determine impacted user sessions and optimize power parameters. Session features 352 can be provided to the performance model 354, 355 to determine an expected performance state and an actual performance state for a session at a cell, in an example. For example, the performance model 355 can receive session features 352 representing the actual state of the session. The performance model 354 can instead receive session features that are influenced or determined by the WI model 353.

In one example, the WI model 353 receives power control parameters 351 and the session features 352. The WI model 353 can then determine an expected uplink SINR. This new value can be used as an input in place of the actual SINR at performance model 354. The power control parameters 351 can be hypothetical and iteratively increased as part of power control optimization. The hypothetical power control parameters 351 with the greatest number of positively impacted sessions can be selected for use as actual power control parameters.

The performance model 354 can output an expected performance value. An impact evaluation function can compare the expected performance value against an actual performance value output from performance model 355. The actual throughput can likewise be estimated by the performance model 355. Performance model 355 can be the same as performance model 354 in an example. Although throughput is used as an example, other performance value types are possible as outputs from the performance model 354, 355.

The difference between performance values can indicate an impact, in an example. In one example, the difference must exceed a threshold before an impact is indicated. The evaluation platform can track the number of impacted sessions at a cell for purposes of identifying when to change the actual power control parameters of the cell.

Figure 4:
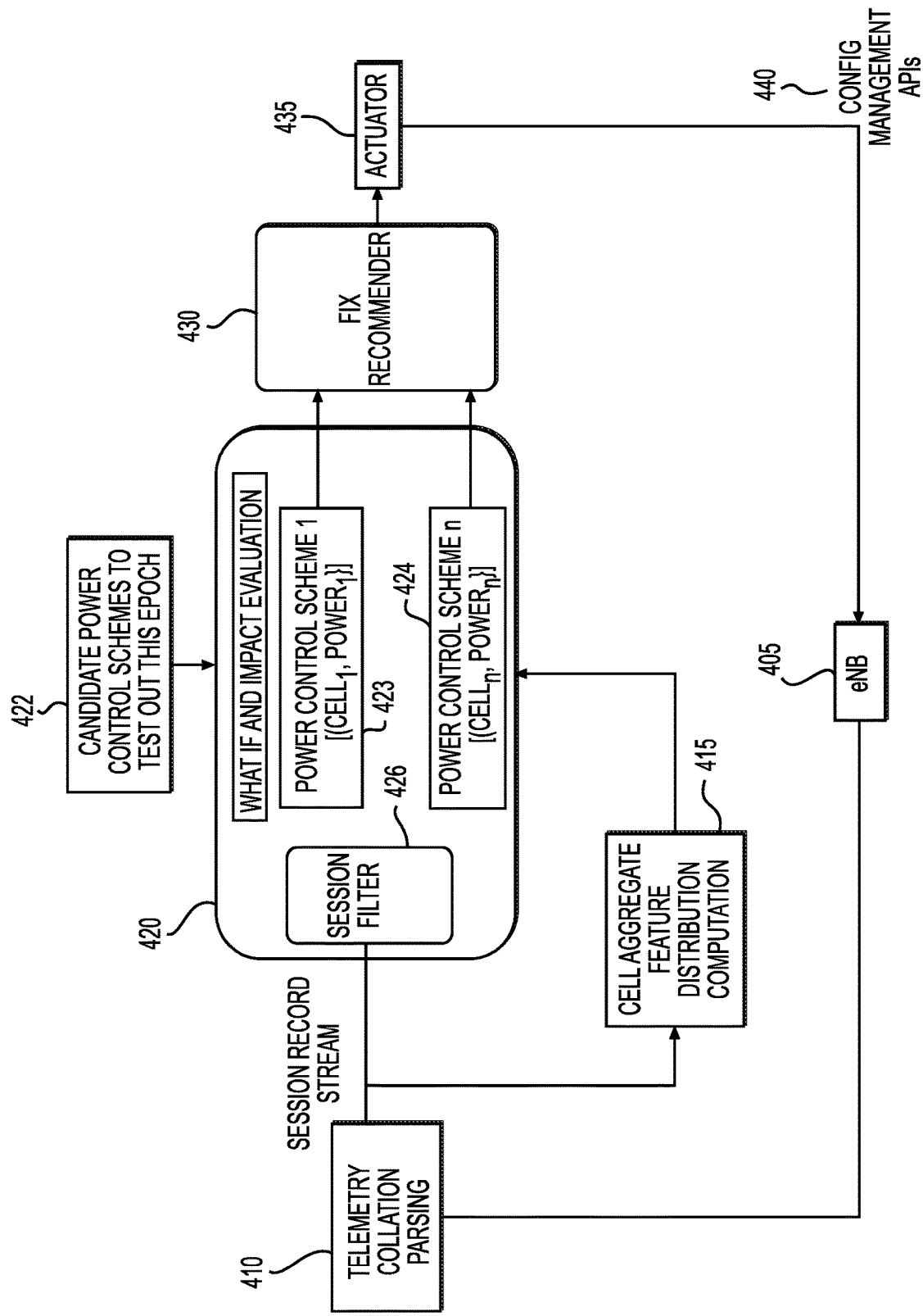
FIG. 4 is an example illustration of system components for dynamically adjusting transmission power parameters at a base station.

FIG. 4 is an example illustration of system components for dynamically adjusting transmission power parameters at a base station. The eNodeB 405 (one type of cell) can send real-time telemetry data to a collation and parsing function 410 of the evaluation platform. Collation and parsing function 410 can be part of the observe functionality 320 of the system. Function 410 can collate the telemetry data in real time and construct session features for the predict functionality 330 to use.

The evaluation platform 420 can filter the collated telemetry into those session features being analyzed over a common period of time. Aggregate features of a cell, such as power headroom and others can be determined from the parsed telemetry and provided by aggregation function 415. Then, various power control schemes 423, 424 can be evaluated.

For each processed session, the evaluation platform 420 can pick the current candidate power control schemes 422 from a database. Each candidate power control scheme 422 can be a list of tuples using the format: [(Cell$_i$, Power$_i$)]. The WI model can consider each cell in the list at the power specified in the tuple.

For the considered power control schemes 422, sessions that can potentially be impacted are filtered and evaluated. Additional parameters for the WI model on each session can be computed in real time. This information can have one-to-one mapping to the serving cell of the session record and thus can be retrieved. The output of the WI model and impact analysis for a session record can be a binary outcome that tells the system whether the session record's performance (quality of service) improved with the candidate scheme under consideration.

These session-specific outcomes can be aggregated in fix recommender 430. The fix recommender 430 can maintain counters for each scheme to record how each candidate power control scheme 422 is performing.

Periodically, the fix recommender 430 can compare all the outcomes collected in the last time bin and pick the power control scheme 423, 424 that performed the best. The fix recommender 430 can then pass the power control parameters of that best-performing scheme to the actuator 435.

The actuator 435 can include a controller that performs the configuration change. To do this, the actuator 435 can utilize configuration APIs 440. This can change the power level parameters at the eNodeB 405. Because the system is closed loop, the impacts of the change can be observed as the collation and parsing function 410 of the evaluation platform continues to take in session information from the eNodeB 405.

Figure 5:
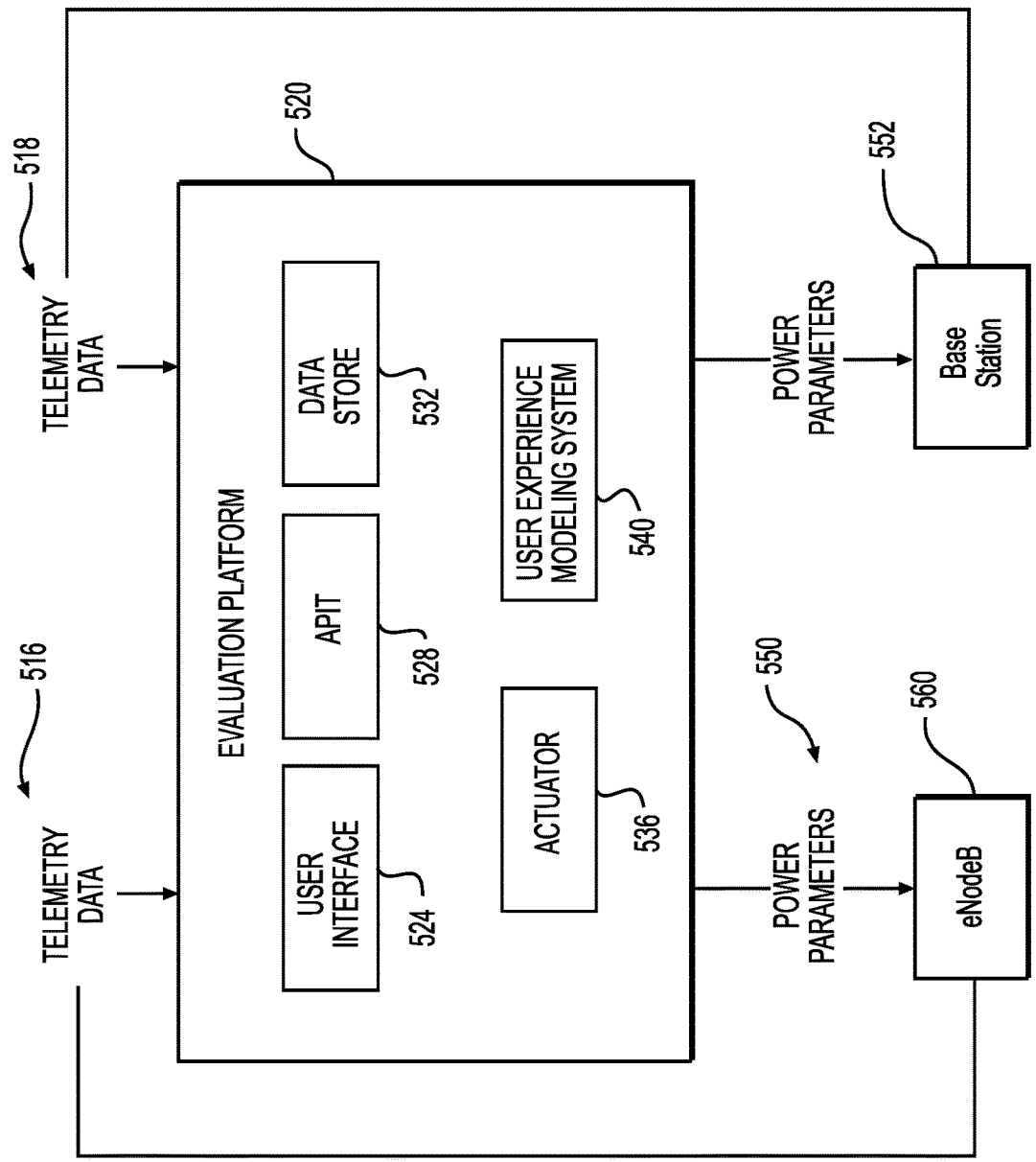
FIG. 5 is an example illustration of system components for dynamically adjusting transmission power parameters at a base station.

FIG. 5 shows an illustration of an example system that includes an evaluation platform 520 in a closed loop with multiple cells 560, 552. The system can exist as part of a wireless network that provides network communication for mobile devices. For example, the network can be at least one of a mobile network, cellular network, wireless network, wireless spectrum network, or any other network maintained by a network operator. In some examples, the network operator is a streaming media provider, internet service provider, vendor, or other entity associated with a network.

A first cell 560 can send telemetry data that is received or retrieved by the evaluation platform 520. The evaluation platform 520 can also receive or retrieve information from a separate, second cell 552 that provides its own telemetry data 518. The telemetry data 516, 518 can provide a time-frequency characteristic and a spatial characteristic. In some examples, telemetry data 516, 518 includes at least one of: a timestamp of when an event occurred in the network; a threshold relating to data bandwidth, download speed, call failure, or other aspect of the network has been exceeded, and at what time; the frequency of calls being dropped for VoiceIP data; the location of cell towers within the mobile network; customer complaints received, in which areas, and at what frequency; and any other data relating to the network and telemetry 516, 518. The platform 520 can monitor the network and collect the associated telemetry data 516, 518. In some embodiments, the telemetry data 516, 518 is stored within a datastore 532 within the platform 520 or available to the platform 520.

The telemetry data 516, 518 can also include at least one of user network session throughput information for at least one user network session, and user network session radio access network ("RAN") information for at least one user network session. In some examples, RAN information includes information describing radio communication between a transceiver of an edge node of the network and a modem of a UE of the user network session. In some embodiments, RAN information for a user network session ("user session" or "session") includes at least one of: downlink coverage (RSRP, RSRQ) of the user session; downlink quality (SINR, CQI) experienced by the user session; uplink coverage (path loss, uplink power restriction) of the user session; uplink quality (PUSCH, PUCCH SINR) experienced by the user session; downlink modulation and coding for the user session; uplink modulation and coding for the user session; downlink PRB resources allocated for the user session; downlink PRB usage of cell; uplink PRB resources allocated for the user session; uplink PRB usage of cell; control channel utilization in cell; number of active users in cell on uplink and downlink; number of active users in cell perceived by user session; QCI of the user session; downlink NACK rate of the user session; downlink DTX rate of the user session; uplink NACK rate of the user session; uplink DTX rate of the user session; available bandwidth and control channel elements on uplink and downlink; and Power Headroom Reports (PHR) of the user session.

In some examples, the network includes at least one infrastructure element, such as, for example, a base station, a cell tower, and other elements of a mobile network infrastructure. The network can be a Long-Term Evolution ("LTE") network or a 5G network, for example. In some embodiments, the network includes at least one edge node. The edge node can include at least one of a radio transceiver, a power amplifier, and an antenna. In some examples, the edge node is constructed to exchange information with at least one user device (e.g., a mobile phone or IoT device that includes a wireless network interface device) using the radio transceiver of the edge node and a radio transceiver included in a wireless modem of the user device.

In some examples, the edge node of the network is a base station node. For example, the edge node can be an eNodeB 560. The edge station node can be communicatively coupled to at least one of a Radio Network Controller ("RNC"), a Mobility Management Entity ("MME") node, a gateway node (such as a serving gateway or packet data network gateway), and a home subscriber server ("HSS").

In some examples, prior to exchanging information with a user device, the edge node establishes a wireless communication session with the user device by performing a signaling process. As a result of the signaling processing, a communication session can be established between the user device and the edge node of the network. In some examples, each session between a user device and an edge node of the network is managed by an MME of the network.

The evaluation platform 520 can be implemented by a mobile networking service, network monitoring and/or control service, network security service, internet service provider, or any other network service. In some examples, one or more aspects of the system can be enabled by a web-based software platform operable on a web server or distributed computing system. In some examples, the platform 520 can be implemented as at least one hardware device that includes a bus that interfaces with processors, a main memory, a processor-readable storage medium, and a network interface device. The bus can also interface with at least one of a display device and a user input device.

In some examples, at least one network interface device of the platform 520 is communicatively coupled to at least one network interface device of the network (e.g., an MME) directly or indirectly via one of a public network (e.g., the Internet) or a private network. In some examples, at least one network interface device of the platform 520 is communicatively coupled to a network interface of at least one cell 560, 552.

The platform 520 can include an API system 528 that provides an API that is used by a cell 560, 552 for communications with or from the platform 520. In some examples, the API system 528 provides a REST API. The API system 528 can include a web server that provides a web-based API. The API system 528 can be configured to process requests received from a node of the mobile network (e.g., a network monitoring system) to receive telemetry data from the network. In some embodiments, the API system 528 includes a web server that provides a web-based API. The API can allow the evaluation platform 520 to supply power parameters 440 to the cells 560, 552. The actuator 536 can use the API 528 to supply power parameters 550 to the cells 560, 552, in an example.

In some examples, the platform 520 includes a user interface system 524. The user interface system 524 can be an application server (e.g., web server) that is configured to provide a GUI through which an administrator can interact with the platform 520. This can allow the administrator to set thresholds regarding what qualifies as impacted session and how many impacted sessions are needed before the evaluation platform dynamically changes power parameters 550 at the cells 560, 552.

The platform 520 can process communications from cells 560, 552 (e.g., through the API system 528 of the platform 520 or the user interface system 524 of the platform 520) relating to telemetry data 516, 518. For example, the cells 560, 552 can provide the platform 520 with connection information for establishing a network connection with a node of the mobile network, and the platform 520 can use that connection information to establish a network connection with the node 560, 552 of the mobile network and receive telemetry data 516, 518 via the established network connection.

As mentioned above, the platform 520 can include a data store 532. The data store 532 can be a database (e.g., a relational database, a NoSQL database, a data lake, a graph database). The data store 532 can include telemetry data of the cell 560. The platform 520 can access telemetry data 516, 518 from the cells 560, 552 and store the accessed telemetry data 516, 518 in the data store 532. The data store 532 can include one or more databases in which telemetry data 516, 518 collected from operators of mobile networks or other various entities is stored. In one example, the data store 532 includes a mobile network databank for storing mobile network data during an analysis of problems within the network.

The platform 520 can also include a user experience modeling system 540. In some examples, the modeling system 540 generates a trained user experience model that outputs a prediction of a user experience value given an input data set that includes data for one or more features included in RAN information of the network. The data can include, for example, RAN information stored in the data store 532 and RAN information received as telemetry data 516, 518 from the network. In some examples, each input data set input into the trained user experience model represents a user network session. For each input data set being used to train a user-experience model, the platform 520 can access information indicating at least one of uplink throughput, downlink throughput, voice quality, call drops, and setup failures. In some examples, for each input data set being used to train a user-experience model, the platform 520 stores information indicating at least one of uplink throughput, downlink throughput, voice quality, call drops, and setup failures.

In some examples, the modeling system 540 generates the trained user experience model to predict at least one of uplink throughput, downlink throughput, voice quality, call drops, and setup failures as a target of the model. The modeling system 540 can generate the trained user experience model based on user input received from the cells 560, 552. The user input can identify at least one of a target for the model and a feature of RAN information to be used by the model. The platform 520 can store at least one trained user-experience model, such as by storing it within the data store 532. The platform 520 can also receive or access a trained user-experience model provided by a cell 560, 552.

The platform 520 can be a multi-tenant platform that manages platform accounts for a plurality of networks. For example, a first platform account can be associated with a first cell 560 and first network, while a second platform account can be associated with a second cell 552 and a second mobile network. In some examples, the platform 520 stores a first user-experience model for the first platform account and a second user-experience model for the second platform account. The first user-experience model can be trained on RAN information received from the first network, while the second user-experience model can be trained on RAN information received from the second network. Alternatively, the user-experience models can be trained based on combined information from both the first and second networks. In some examples, the first user-experience model has a target selected by the first cell 560, while the second user-experience model has a target selected by the second cell 552.

The user experience modeling system 540 can include one or more of a local machine learning system (e.g., implemented in Python, R, or another language) or a cloud-based machine learning client (e.g., an application communicatively coupled to a cloud-based machine learning system such as, for example, MICROSOFT AZURE MACHINE LEARNING SERVICE). At least one machine learning system included in the system 540 can be configured to perform one or more of: supervised learning (e.g., using logistic regression, back propagation neural networks, random forests, or decision trees), unsupervised learning (e.g., using an apriori algorithm or kmeans clustering), semi-supervised learning, reinforcement learning (e.g., using a Q-learning algorithm or temporal difference learning), and any other suitable learning style.

In some examples, at least one model generated by the system 540 implements at least one of: a regression algorithm (e.g., ordinary least squares, logistic regression, stepwise regression, multivariate adaptive regression splines, or locally estimated scatterplot smoothing), an instance-based method (e.g., k-nearest neighbor, learning vector quantization, or self-organizing map), a regularization method (e.g., ridge regression, least absolute shrinkage and selection operator, or elastic net), a decision tree learning method (e.g., classification and regression tree, iterative dichotomiser 3, C4.5, chi-squared automatic interaction detection, decision stump, random forest, multivariate adaptive regression splines, or gradient boosting machines), a Bayesian method (e.g., naïve Bayes, averaged one-dependence estimators, or Bayesian belief network), a kernel method (e.g., a support vector machine, a radial basis function, or a linear discriminant analysis), a clustering method (e.g., k-means clustering or expectation maximization), an associated rule learning algorithm (e.g., an apriori algorithm or an Eclat algorithm), an artificial neural network model (e.g., a Perceptron method, a back-propagation method, a Hopfield network method, a self-organizing map method, or a learning vector quantization method), a deep learning algorithm (e.g., a restricted Boltzmann machine, a deep belief network method, a convolutional network method, or a stacked auto-encoder method), a dimensionality reduction method (e.g., principal component analysis, partial least squares regression, Sammon mapping, multidimensional scaling, or projection pursuit), an ensemble method (e.g., boosting, bootstrapped aggregation, AdaBoost, stacked generalization, gradient boosting machine method, or random forest method), and any other suitable form of machine learning algorithm. In some examples, at least one processing portion of the system 540 can additionally or alternatively leverage: a probabilistic module, heuristic module, deterministic module, or any other suitable module leveraging any other suitable computation method, machine learning method or combination thereof. Any suitable machine learning approach can otherwise be incorporated in the system 540.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for improving quality of service of users impacted by uplink interference in a telco network, comprising:
    observing an actual performance value for a first user session at a first cell of a plurality of cells in the telco network;
    using a trained performance model, predicting an expected performance value for the first user session, wherein the prediction includes utilizing a new uplink signal-to-interference-plus noise ("SINR") value as an input to the trained performance model, wherein the new uplink SINR value is determined using a hypothetical value for at least one of pZeroNominalPucch, pZeroNominalPusch, and alpha;
    determining an impact on the first user session based on the expected performance value differing from the actual performance value by at least a threshold amount; and
    dynamically adjusting a power level parameter at the first cell based on the hypothetical value, wherein the hypothetical value is increased iteratively in an instance where the total number of impacted user sessions does not met a threshold number of impacted user sessions.

2. The method of claim 1, wherein the actual and expected performance values measure one of throughput, voice quality, connection drop rate, and connection setup failure rate.

3. The method of claim 1, wherein the new uplink SINR is determined based on a difference between signal power of the first cell for the first user session and interference power of a neighboring cell, the signal power and interference power both being determined using the hypothetical value.

4. The method of claim 1,
    wherein observing the actual performance value includes creating a vector of session features for the first user session, the session features including downlink channel quality, uplink channel quality, number of antennas, and signal strength,
    wherein the session features are inputs to the trained performance model, and
    wherein the trained performance model outputs a throughput value as the actual performance value.

5. The method of claim 1, further comprising:
    determining a total number of impacted user sessions based on respective expected performance values of multiple different user sessions; and
    dynamically adjusting the power level parameter when the total number of impacted user sessions is greater than the threshold number of impacted user sessions.

6. The method of claim 1, wherein the hypothetical value is increased iteratively from a current value for the neighboring cell, wherein the current value is retrieved from a database.

7. A non-transitory, computer-readable medium containing instructions that, when executed by a hardware-based processor, perform stages for optimizing power parameters in a telco network, the stages comprising:
    observing an actual performance value for a first user session at a first cell of a plurality of cells in the telco network;
    using a trained performance model, predicting an expected performance value for the first user session, wherein the prediction includes utilizing a new uplink signal-to-interference-plus noise ("SINR") value as an input to the trained performance model, wherein the new uplink SINR value is determined using a hypothetical value for at least one of pZeroNominalPucch, pZeroNominalPusch, and alpha;
    determining an impact on the first user session based on the expected performance value differing from the actual performance value by at least a threshold amount; and
    dynamically adjusting a power level parameter at the first cell based on the hypothetical value, wherein the hypothetical value is increased iteratively in an instance where the total number of impacted user sessions does not meet a threshold number of impacted user sessions.

8. The non-transitory, computer-readable medium of claim 7, wherein the actual and expected performance values measure one of throughput, voice quality, connection drop rate, and connection setup failure rate.

9. The non-transitory, computer-readable medium of claim 7, wherein the new uplink SINR is determined based on a difference between signal power of the first cell for the first user session and interference power of a neighboring cell, the signal power and interference power both being determined using the hypothetical value.

10. The non-transitory, computer-readable medium of claim 7,
    wherein observing the actual performance value includes creating a vector of session features for the first user session, the session features including downlink channel quality, uplink channel quality, number of antennas, and signal strength,
    wherein the session features are inputs to the trained performance model, and
    wherein the trained performance model outputs a throughput value as the actual performance value.

11. The non-transitory, computer-readable medium of claim 7, the stages further comprising:
    determining a total number of impacted user sessions based on respective expected performance values of multiple different user sessions; and
    dynamically adjusting the power level parameter when the total number of impacted user sessions is greater than the threshold number of impacted user sessions.

12. The non-transitory, computer-readable medium of claim 7, wherein the hypothetical value is increased iteratively from a current value for the neighboring cell, wherein the current value is retrieved from a database.

13. A system for optimizing power parameters in a telco network, comprising:
a memory storage including a non-transitory, computer-readable medium comprising instructions; and
a computing device including a hardware-based processor that executes the instructions to carry out stages comprising:
observing an actual performance value for a first user session at a first cell of a plurality of cells in the telco network;
using a trained performance model, predicting an expected performance value for the first user session, wherein the prediction includes utilizing a new uplink signal-to-interference-plus noise ("SINR") value as an input to the trained performance model, wherein the new uplink SINR value is determined using a hypothetical value for at least one of pZeroNominalPucch, pZeroNominalPusch, and alpha;
determining an impact on the first user session based on the expected performance value differing from the actual performance value by at least a threshold amount; and
dynamically adjusting a power level parameter at the first cell based on the hypothetical value, wherein the hypothetical value is increased iteratively in an instance where the total number of impacted user sessions does not meet a thershold number of impacted user sessions.

14. The system of claim 13, wherein the actual and expected performance values measure one of throughput, voice quality, connection drop rate, and connection setup failure rate.

15. The system of claim 13, wherein the new uplink SINR is determined based on a difference between signal power of the first cell for the first user session and interference power of a neighboring cell, the signal power and interference power both being determined using the hypothetical value.

16. The system of claim 13,
wherein observing the actual performance value includes creating a vector of session features for the first user session, the session features including downlink channel quality, uplink channel quality, number of antennas, and signal strength,
wherein the session features are inputs to the trained performance model, and
wherein the trained performance model outputs a throughput value as the actual performance value.

17. The system of claim 13, the stages further comprising:
determining a total number of impacted user sessions based on respective expected performance values of multiple different user sessions; and
dynamically adjusting the power level parameter when the total number of impacted user sessions is greater than the threshold numbeer of impacted user sessions.

18. A method for improving quality of service of users impacted by uplink interference in a telco network, comprising:
observing an actual performance value for a first user session at a first cell of a plurality of cells in the telco network;
using a trained performance model, predicting an expected performance value for the first user session, wherein the prediction includes utilizing a new uplink signal-to-interference-plus noise ("SINR") value as an input to the trained performance model, wherein the new uplink SINR value is determined using a hypothetical value for at least one of pZeroNominalPucch, pZeroNominalPusch, and alpha, wherein the new uplink SINR is determined based on a difference between signal power of the first cell for the first user session and interference power of a neighboring cell, the signal power and interference power both being determined using the hypothetical value;
determining an impact on the first user session based on the expected performance value differing from the actual performance value by at least a threshold amount; and
dynamically adjusting a power level parameter at the first cell based on the hypothetical value.

19. A non-transitory, computer-readable medium containing instructions that, when executed by a hardware-based processor, perform stages for optimizing power parameters in a telco network, the stages comprising:
observing an actual performance value for a first user session at a first cell of a plurality of cells in the telco network;
using a trained performance model, predicting an expected performance value for the first user session, wherein the prediction includes utilizing a new uplink signal-to-interference-plus noise ("SINR") value as an input to the trained performance model, wherein the new uplink SINR value is determined using a hypothetical value for at least one of pZeroNominalPucch, pZeroNominalPusch, and alpha, wherein the new uplink SINK is determined based on a difference between signal power of the first cell for the first user session and interference power of a neighboring cell, the signal power and interference power both being determined using the hypothetical value;
determining an impact on the first user session based on the expected performance value differing from the actual performance value by at least a threshold amount; and
dynamically adjusting a power level parameter at the first cell based on the hypothetical value.

20. A method for improving quality of service of users impacted by uplink interference in a telco network, comprising:
observing an actual performance value for a first user session at a first cell of a plurality of cells in the telco network;
using a trained performance model, predicting an expected performance value for the first user session, wherein the prediction includes utilizing a new uplink signal-to-interference-plus noise ("SINR") value as an input to the trained performance model, wherein the new uplink SINR value is determined using a hypothetical value for at least one of pZeroNominalPucch, pZeroNominalPusch, and alpha;
determining an impact on the first user session based on the expected performance value differing from the actual performance value by at least a threshold amount; and
dynamically adjusting a power level parameter at the first cell based on the hypothetical value,
wherein observing the actual performance value includes creating a vector of session features for the first user session, the session features including downlink channel quality, uplink channel quality, number of antennas, and signal strength,
wherein the session features are inputs to the trained performance model, and
wherein the trained performance model outputs a throughput value as the actual performance value.

21. A non-transitory, computer-readable medium containing instructions that, when executed by a hardware-based processor, perform stages for optimizing power parameters in a telco network, the stages comprising:
- observing an actual performance value for a first user session at a first cell of a plurality of cells in the telco network;
- using a trained performance model, predicting an expected performance value for the first user session, wherein the prediction includes utilizing a new uplink signal-to-interference-plus noise ("SINR") value as an input to the trained performance model, wherein the new uplink SINR value is determined using a hypothetical value for at least one of pZeroNominalPucch, pZeroNominalPusch, and alpha;
- determining an impact on the first user session based on the expected performance value differing from the actual performance value by at least a threshold amount; and
- dynamically adjusting a power level parameter at the first cell based on the hypothetical value,
- wherein observing the actual performance value includes creating a vector of session features for the first user session, the session features including downlink channel quality, uplink channel quality, number of antennas, and signal strength,
- wherein the session features are inputs to the trained performance model, and
- wherein the trained performance model outputs a throughput value as the actual performance value.

22. A method for improving quality of service of users impacted by uplink interference in a telco network, comprising:
- observing an actual performance value for a first user session at a first cell of a plurality of cells in the telco network;
- using a trained performance model, predicting an expected performance value for the first user session, wherein the prediction includes utilizing a new uplink signal-to-interference-plus noise ("SINR") value as an input to the trained performance model, wherein the new uplink SINR value is determined using a hypothetical value for at least one of pZeroNominalPucch, pZeroNominalPusch, and alpha;
- determining an impact on the first user session based on the expected performance value differing from the actual performance value by at least a threshold amount; and
- dynamically adjusting a power level parameter at the first cell based on the hypothetical value,
- wherein the hypothetical value is increased iteratively from a current value for the neighboring cell, wherein the current value is retrieved from a database.

23. A non-transitory, computer-readable medium containing instructions that, when executed by a hardware-based processor, perform stages for optimizing power parameters in a telco network, the stages comprising:
- observing an actual performance value for a first user session at a first cell of a plurality of cells in the telco network;
- using a trained performance model, predicting an expected performance value for the first user session, wherein the prediction includes utilizing a new uplink signal-to-interference-plus noise ("SINR") value as an input to the trained performance model, wherein the new uplink SINR value is determined using a hypothetical value for at least one of pZeroNominalPucch, pZeroNominalPusch, and alpha;
- determining an impact on the first user session based on the expected performance value differing from the actual performance value by at least a threshold amount; and
- dynamically adjusting a power level parameter at the first cell based on the hypothetical value,
- wherein the hypothetical value is increased iteratively from a current value for the neighboring cell, wherein the current value is retrieved from a database.

* * * * *